Williamson & Forsythe,
Saw-Mill Head-Block.
N° 36,748.  Patented Oct. 21, 1862.
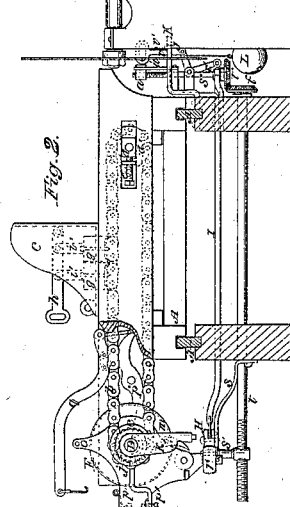
Fig. 2
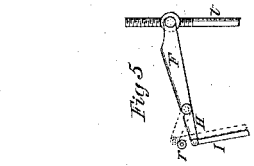
Fig. 5
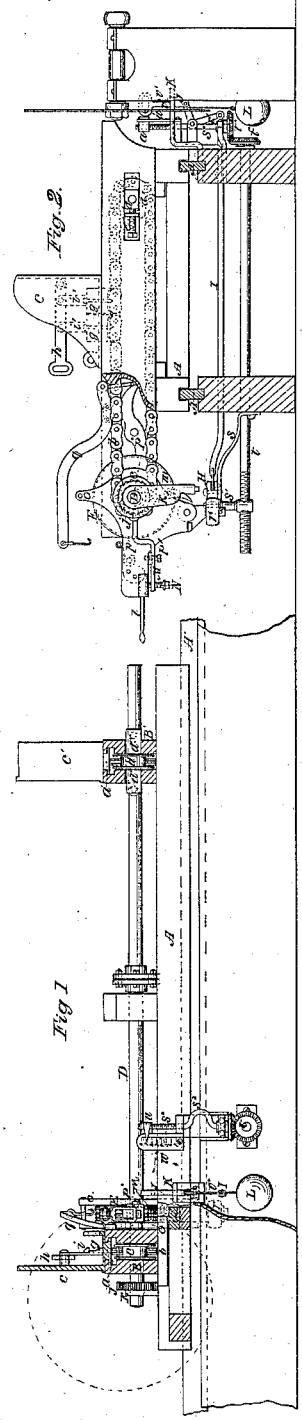
Fig. 1
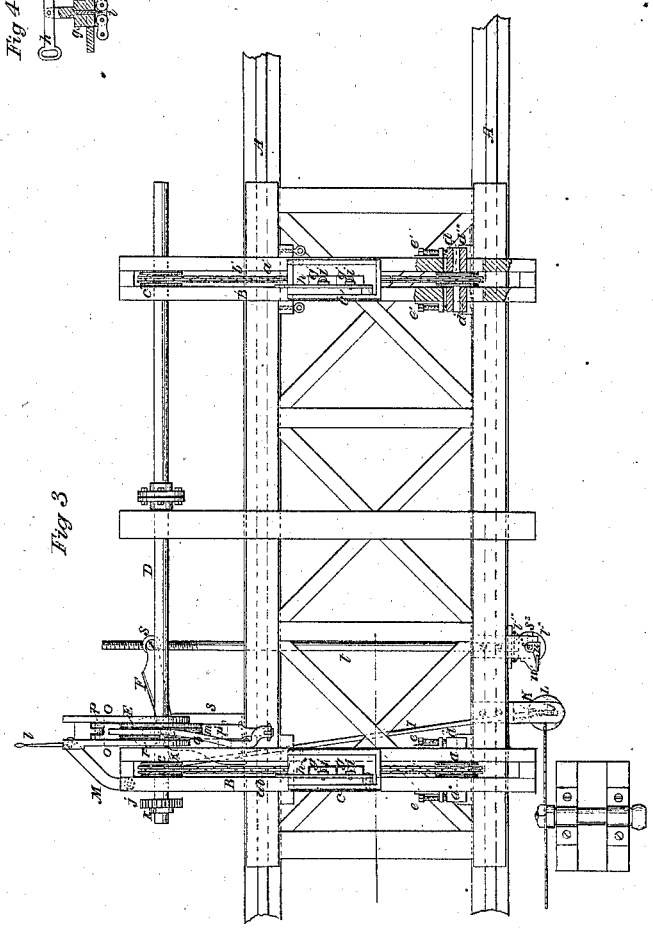
Fig. 3
Fig. 4
Witnesses:
Inventor:
John N. Williamson
S. Forsythe

UNITED STATES PATENT OFFICE.

J. R. WILLIAMSON AND SAMUEL FORSYTHE, OF SEABECK, WASHINGTON TERRITORY.

IMPROVEMENT IN SAW-GEARS.

Specification forming part of Letters Patent No. 36,748, dated October 21, 1862.

*To all whom it may concern:*

Be it known that we, J. R. WILLIAMSON and SAMUEL FORSYTHE, both of Seabeck, in the county of Kitsap and Territory of Washington, have invented a new and Improved Saw-Gear; and we do hereby declare that the following is a full, clear, and exact description of the same, reference being had to the accompanying drawings, forming a part of this specification, in which—

Figure 1 represents a longitudinal vertical section of our invention. Fig. 2 is an end elevation of the same. Fig. 3 is a plan or top view of the same. Fig. 4 is a detached sectional view of the catches whereby the standards are thrown in gear with the endless chains. Fig. 5 is a detached plan view of the inclined planes.

Similar letters of reference in the several figures indicate corresponding parts.

This invention relates to certain improvements in those parts of a saw-gear which serve to feed the log toward the saw and to determine the thickness of the boards to be cut, said parts being so arranged that the thickness of the cut can be changed at pleasure, and that the feed can be effected by hand or automatically by the machine itself, as may be desired, and that in gigging back the feeding device can be automatically thrown out of gear or rendered ineffective.

To enable those skilled in the art to make and use our invention, we will proceed to describe its construction.

A is the carriage, which moves on ways A' in the usual manner, and which is provided with two or more head-blocks, B B', which support the log, and on the surface of which the log is fed toward the saw by means of standards C C', which slide in ways $a\ a'$ on the top of head-blocks in a direction transversely to the ways A', on which the carriage A moves. The motion of the standards C C' on the head-blocks is produced by two endless chains, $b\ b'$, which are stretched over chain-wheels $c\ d\ c'\ d'$ in the interior of the head-blocks. The chain-wheels $d\ d'$ have their bearings in boxes $d^*\ d'^*$, which slide in slots in the slides of the head-blocks, and to which a longitudinal motion can be imparted by set-screws $e\ e'$, for the purpose of regulating the tension of the chains. The chain-wheels $c\ d$ are secured to a shaft, D, which extends from one end of the carriage to the other, and which has its bearings in journal-boxes secured to the ends of the head-blocks B B'. The head-block B', which is loose, so that it can be moved on the carriage A toward and from the fixed head-block B, for the purpose of accommodating the same to the length of different logs, slide on the shaft D, which is provided with a longitudinal groove fitting to a key in the chain-wheel $c'$, so that said chain-wheel is compelled to rotate with the shaft D, in whatever position the head-block B' may be brought. The chains $b\ b'$ are made of links precisely alike in length, and they are brought in gear with the standards C C' by means of forked catches $g\ g'$, which are suspended from levers $h\ h'$, that are pivoted to the sides of standards C C'. Each of these catches straddles a link of the chain, and its points project down between the ends of the outer links when the levers $h\ h'$ are depressed.

In order to prevent the chains slipping, and to hold them securely in gear with the standards, each of the forked catches $g\ g'$ is provided with a central movable prong, $i\ i'$, which passes down through a mortise between the points of the catch, and the point of which drops between the ends of the inner links of the chains. The prongs $i\ i'$ are provided with heads, so that by raising the levers $h\ h'$ said prongs, together with the catches $g\ g'$, are disengaged from the links of the chains, thereby throwing the standards C C' out of gear, and by depressing the levers $h\ h'$ the prongs and catches drop between the links of the chains and bring them securely in gear with the standards.

The shaft D is operated either by the ratchet-wheel $j$ and hand-lever $k$, or by the friction-gear E, to which motion may be imparted by the hand-lever $l$, or automatically by the action of the inclined plane F, as will be presently explained.

The friction-gear E consists of a grooved disk, $m$, which is firmly keyed to the shaft D, and which is situated between two brackets, $o$, that swing loosely on the shaft D. These brackets carry the pawl $p$, which is hinged in such a manner that it turns up freely, but when turned down its pivots catch into the grooves of the disk $m$, and if the brackets $o$ are now raised by means of the hand-lever $l$ said disk rotates in the direction of the arrow marked on it in Fig. 2. A set-screw, $p'$, prevents the pawl from catching hard and binding in the grooved disk, and an additional pawl, $p^*$, which is pivoted to the inner side of the hand-block B in a reversed position, prevents said disk turning back in the direction opposite to the arrow marked upon it in Fig. 2. Both pawls $p$ and $p^*$ are so arranged that they can be suspended from a curved arm, $q$, that is firmly secured to the head-block B, and when the pawls are suspended from said arm the grooved disk, with the shaft D, can turn freely in either direction. If the pawls are brought in contact with the grooved disk and an oscillating motion is imparted to the brackets $o$ by means of the hand lever $l$, the shaft D is rotated in the direction marked upon it in Fig. 2, and if the standards are in gear with the chain they move up to the saw.

For the purpose of producing the feed automatically by the motion of the carriage, a roller, $r$, is attached to the lower ends of the brackets $o$, and in gigging back this roller passes over the inclined plane F and produces a motion of the disk $m$ and standards C C' corresponding to the degree of inclination given to said inclined plane. One end of this inclined plane is pivoted to a bracket, $s$, that is rigidly attached to some portion of the building, or to the beams supporting the ways, and its other end is pivoted to the top of a stud, $s'$, the lower part of which forms a nut for a screw-rod, $t$, to which a rotary motion can be imparted by a crank, $s^2$, on an upright shaft, $s^*$, which is connected with the screw-rod $t$ by a bevel-gear, $t^*$ $t'^*$. The upper end of the crank-shaft $s^*$ is provided with a screw-thread, and it carries the index $u$, which moves up and down on the dial-plate $u'$. If the crank shaft $s^*$ is turned one way, the stud $s'$ is moved out toward the end of the screw-rod $t$, thereby increasing the degree of inclination of the inclined plane F, and at the same time the index $u$ is carried down over the dial-plate $u'$, and if the crank-shaft is turned in the opposite direction the inclination of the inclined plane is diminished and the index travels up. By these means the quantity of feed imparted to the shaft D and standards C C' by the action of the roller $r$ on the inclined plane F can be regulated at pleasure, and it will be easily understood how the thickness of the boards to be cut can be determined from inch to inch by making a proper scale on the dial-plate $u'$.

The roller $r$ is hinged to the lower edge of the brackets $o$, and it is so arranged that when pressed forward it remains rigid with said brackets; but when pressed in the opposite direction it swings back, so that it may pass by freely on the rear edge of the inclined plane F. If it is desired, therefore, to gig back without producing a feed motion, it is only necessary to apply some device which will turn the roller $r$ back so that it clears the inclined plane F. This purpose is effected by an additional inclined plane, H, one end of which is pivoted to the bracket $s$, whereas its other end is secured to a sliding bar, I, which is operated by a handle, J. Said handle slides up and down in a slotted bracket, K, and it is retained, when drawn up, by a shoulder, $v$, catching over the edge of the slot in the bracket K, and by a spring, $v'$, which prevents the shoulder disengaging spontaneously. It connects with the end of the bar I by a bell-crank lever, $v^*$, and when it is depressed, so as to push out the bar I and additional inclined plane H, it is kept in position by a weight, L.

If the handle J is raised, the additional inclined plane H occupies a position shown in black outlines in Fig. 5, and the roller $r$ strikes the inclined plane F and produces a feed motion corresponding to the position of said inclined plane; but if the additional inclined plane H is turned out in the position shown in red outlines in Fig. 5 its point strikes the roller $r$, so as to turn the same back and to make it pass on the inner side of the inclined plane F without producing any feed motion.

An arm, M, with a set-screw, N, extends under the brackets $o$ and prevents them from sinking back any farther than desirable, and by means of said set-screw the roller $r$ can be brought in the correct position in regard to the inclined planes F and H, and the action of the inclined plane F on the brackets $o$ can be regulated.

By the use of this saw-gear the operation of sawing up logs into boards with a circular saw is rendered comparatively easy and economical in time and labor, and the thickness of the board can be regulated at pleasure.

Having thus fully described our invention, what we claim as new, and desire to secure by Letters Patent, is—

1. The arrangement of the adjustable catches $g$ $i$, or their equivalents, in combination with the endless chains $b$ $b'$ and standards C C', constructed and operating substantially as and for the purpose described.

2. The arrangement of the disk $m$, vibrating brackets $o$, and pawls $p$ $p^*$, in combination with the shaft D and standards C C', as and for the purpose set forth.

3. The arrangement of the adjustable inclined plane F, in combination with the friction-gear E, constructed and operating substantially as and for the purpose specified.

4. The arrangement of the index $u$ and dial $u'$, in combination with the inclined plane F, as and for the purpose described.

5. The additional inclined plane H and hinged roller $r$, in combination with the inclined plane F and friction-gear E, constructed and operating substantially as and for the purpose set forth.

J. R. WILLIAMSON.
SAMUEL FORSYTHE.

Witnesses:
MARSHALL BLINN,
J. W. DRAPER.